C. W. STEWART.
ARTIFICIAL BAIT.
APPLICATION FILED OCT. 4, 1913.

1,088,475.

Patented Feb. 24, 1914.

WITNESSES

INVENTOR
Clarke W. Stewart
BY
ATTORNEYS

UNITED STATES PATENT OFFICE.

CLARKE W. STEWART, OF OLEAN, NEW YORK.

ARTIFICIAL BAIT.

1,088,475.   Specification of Letters Patent.   Patented Feb. 24, 1914.

Application filed October 4, 1913. Serial No. 793,406.

*To all whom it may concern:*

Be it known that I, CLARKE W. STEWART, a citizen of the United States, and a resident of Olean, in the county of Cattaraugus and State of New York, have invented a new and Improved Artificial Bait, of which the following is a full, clear, and exact description.

My invention relates to artificial bait simulating live bait and particularly to a bait in which provision is made for varying the character of the fish simulated.

It is known that to induce the fish to take the bait under particular weather conditions and in particular seasons, the character of the bait must be varied, a bait that serves as a lure under some conditions being unsuccessful under different conditions.

My improved bait is provided with a covering having succeeding layers, each simulating a different fish either as to form or color or both, and the layers are adapted to be successively removed to expose different representations in succession until the correct bait is found to successfully attract the fish under the particular conditions, as season and weather or the particular character of the fish being sought.

The nature of my improved bait and the advantages thereof will be further set forth in the specific description following.

Reference is to be had to the accompanying drawings forming a part of this specification, in which similar characters of reference indicate corresponding parts in all the views.

Figure 1:
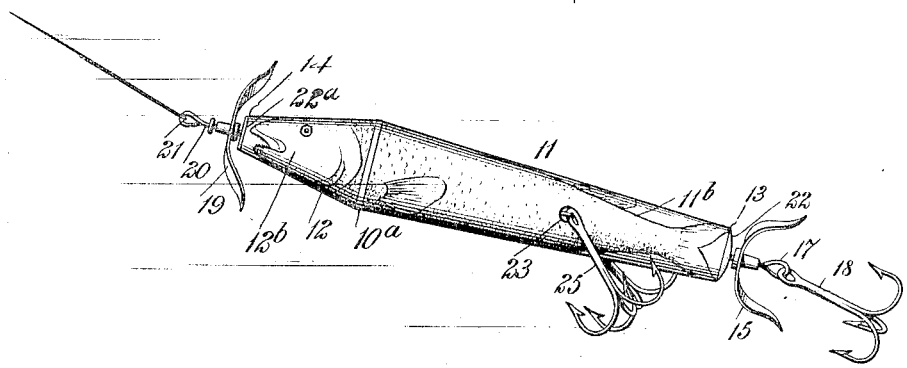
Figure 2:
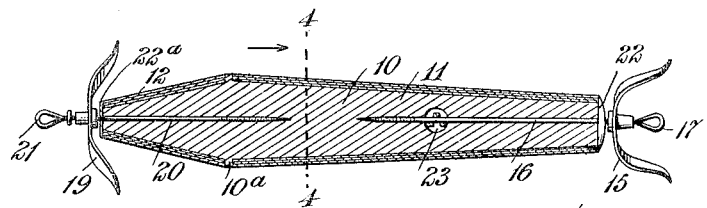
Figure 3:
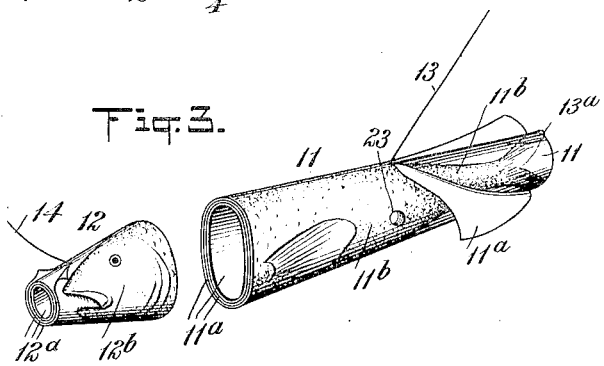
Figure 5:
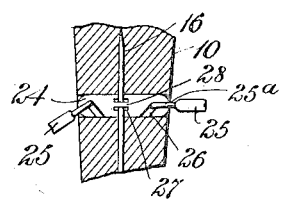
Figure 4:
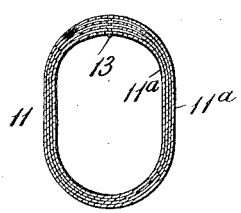

Figure 1 is a perspective view of an artificial bait embodying my invention; Fig. 2 is a longitudinal section; Fig. 3 is a perspective view of the covering sections removed; Fig. 4 is a cross section on a larger scale taken through the body covering, the section being on the line 4—4 of Fig. 2; and Fig. 5 is a fragmentary longitudinal section given to illustrate one means of removably securing gang hooks to the body.

In constructing an artificial bait in accordance with the illustrated example, a core 10 is provided having a covering composed of a body section 11 and a head section 12. The said sections are formed of truncated cones and are disposed on the body with their bases adjacent. The core 10 is correspondingly tapered and preferably at the junction of the oppositely tapered portions, a rib or bead 10$^a$ is disposed on the core against the opposite sides of which the respective bases of the covering sections abut.

The body section 11 is composed of a plurality of layers 11$^a$, it being possible in practice to provide a half dozen or a dozen different layers. Each layer 11$^a$ bears thereon a representation of the body of a different fish or similar live bait, as indicated at 11$^b$. In practice, the several layers will be formed of waterproof paper or like flexible material, and the representation of the fishes will be produced in appropriate colors. Similarly the head section 12 is composed of a plurality of layers 12$^a$ of flexible material, each bearing a representation of the head of a fish, as indicated at 12$^b$.

Provision is made for the ready removal of the layers in succession. As one means for effecting the desired end I have indicated in connection with the body section 11 a string or thread 13, the end 13$^a$ of which will project at the tail or smaller end of the body section to be grasped by the user so that the string may be caused to cut the paper and permit the layer to be stripped off. A corresponding thread 14 is employed beneath each layer of the head section 12.

It is designed, in practice, that the cover sections be furnished separately, each composed of its complement of layers, so that the cover sections may be renewed with a single core and the fisherman may thus be able to equip himself with two cores as a precaution against the loss of one, and with any desired number of cover sections. It will be desirable therefore to provide for the removal of the spinners, gang hooks or other elements employed in connection with the bait, and I have shown in the present instance a spinner 15 which is detachably held at the smaller end of the body by a pin 16, which is received longitudinally in the core, and has an eye 17 or the like for connection of gang hooks 18. Similarly at the head of the bait a spinner 19 is provided secured by a pin 20 to the core and provided with an eye 21 for attachment of the fish line. The pin 16 may have a disk 22 of a diameter larger than the rear end of the core 10 to overlap the ends of the body section 11 of the cover. A similar disk 22$^a$ is provided on the pin 20 to cap the front end of the head section 12.

To removably secure additional gang hooks to the body any suitable means may be provided. I have shown in the present instance a transverse hole 23 formed in the core and in the body section 11, which hole removably receives a block or strip 24 that serves to hold the shanks of gang hooks 25, said shanks having eyes 25ª that are received in slots 26 in the strip 24. The said strip, furthermore, is shown as provided with slots 27 between which is a raised member 28 beneath which the pin 16 passes for securing the strip in position. By removing the pin 16 the strip 24 may be moved laterally sufficient to disengage one gang hook 25 and then moved in the opposite direction to release the opposite gang hook 25.

It will be apparent that with my improved bait a fisherman may provide himself with a very great variety of representations of fishes and that the equipment will occupy but a minimum of space. If desired, the character of the representations may be further varied by exposing a head and a body of different colors. Practice has demonstrated that by the use of the bait presenting successively the representation of different fishes or differently colored fishes under the same conditions a representation can be found that will attract the fish sought. An object of my invention also is that the serious defect of ordinary artificial bait is overcome in that a bright and fully colored representation is available at all times, whereas the paint or coloring of an ordinary bait becomes rubbed off and loses its effectiveness. A variety of representations is also possible at a greatly reduced cost as compared with the separate artificial baits of ordinary forms.

Having thus described my invention, I claim as new and desire to secure by Letters Patent:

1. An artificial bait having a plurality of layers each bearing the representation of a live bait.

2. An artificial bait having a plurality of layers having different representations of live bait.

3. An artificial bait comprising a core and a cover formed of a plurality of layers each bearing a representation of a live bait.

4. An artificial bait having a cover composed of a removable body section, a removable head section, a core, end caps at the front and rear of the core, and means for removably securing the end caps.

5. An artificial bait comprising a core, a removable covering for the core, a hook, and means for securing said hook, said means including a member extending transversely through the core and covering.

6. An artificial bait having a plurality of removable layers of material, each bearing a representation of a live bait, and series of strings between the layers forming a means to sever the latter.

In testimony whereof I have signed my name to this specification in the presence of two subscribing witnesses.

CLARKE W. STEWART.

Witnesses:
R. H. BECRAFT,
C. L. STEWART.